Oct. 10, 1961  E. ROHACS  3,003,522

MEANS FOR DAMPING PULSATIONS IN FLUID PIPE-LINES

Filed April 9, 1959

Inventor
E. Rohacs

United States Patent Office 3,003,522
Patented Oct. 10, 1961

3,003,522
MEANS FOR DAMPING PULSATIONS IN
FLUID PIPELINES
Etienne Rohacs, Saint-Gratien, France
Filed Apr. 9, 1959, Ser. No. 805,298
Claims priority, application France Apr. 12, 1958
5 Claims. (Cl. 138—30)

This invention relates to means for damping pulsations, such as are produced in pipe-lines carrying a fluid which is not or only slightly compressible, particularly when the fluid is impelled by a piston pump. It also relates to the damping of water-hammering caused by the sudden stoppage of flow in the pipes.

Devices of this type are already known, particularly those in which the damping is effected by means of a compressible volume, for example by means of a diaphragm enclosing a volume of compressible gas.

The invention relates to a device of the type described above, but which comprises a novel combination of features which, singly, may be known per se.

The damper according to the invention is characterised particularly by the spherical form of the hollow body, of the core and of the diaphragm with the important result that the diaphragm works under tensile stress or tension between its two extreme positions defined by the core and by the internal surface of the hollow body, respectively, whilst remaining substantially spherical in all its intermediate positions. The entire surface of the diaphragm is thus uniformly effective. The damper moreover comprises a number of improvements in design, which will become apparent from the following description of one embodiment of the invention with reference to the accompanying drawings, in which:

Figure 1:
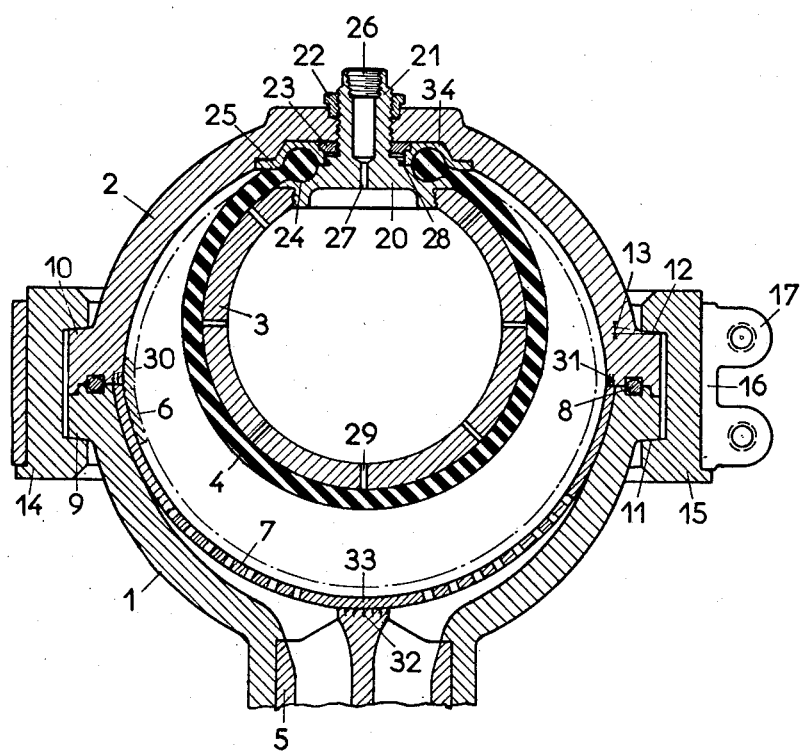
FIGURE 1 is a cross-section, through a central plane, of a damper according to the invention.
Figure 2:
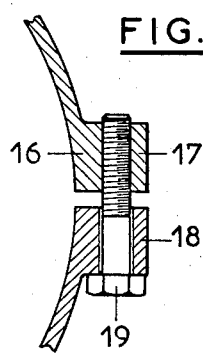
FIGURE 2 is a detail view showing the closure of the outer band.

The damper generally comprises a steel body, which is hollow and substantially spherical in shape, and which is composed of two substantially hemi-spherical parts, the upper part 2 and the lower part 1.

Inside the body is arranged the core 3, made of steel, which is likewise generally spherical and hollow in form, and on the outside of which the diaphragm or bladder 4, of rubber or any other elastic material, bears in the absence of internal pressure.

As known per se, the diaphragm is normally filled with a gas under pressure, the pressure being a function of the mean pressure prevailing in the delivery pipe, not shown, in which pulsations are to be damped, and to which the body of the damper is connected by a connector 5. On the average, the diaphragm thus occupies an intermediate position between that shown and that indicated at 6, in which it bears against the internal surface of the upper part 2 of the body and against the steel strainer 7. The diaphragm prior to enclosing the core 3 or in its unexpanded position has a radius less than the core so that it is under a tensile stress when operating between its two extreme positions.

The arrangement which has just been briefly described by its principal features is an expedient one, because it allows the entire surface of the diaphragm to work uniformly under tensile stress or tension and to bear uniformly on the body or on the core in its two extreme positions, which results cannot be attained by any other form of diaphragm, body and core.

The remaining constructional features are as follows:

(A) The parts 1 and 2 of the body are fitted together on a diametrical plane, a tight seal 8 being placed between them. The assembly is effected by means of two shoulders 9 and 10 surrounding the parts 1 and 2, respectively, and the edge surfaces 11, 12 of which are not parallel but make an angle of a few degrees with the plane of assembly, as indicated at 13.

The said shoulders 9, 10 are clamped between two semi-circular jaws 14, 15. These jaws are gripped by a band 16 of spring steel, which is closed by two pairs of nuts 17, 18 and each pair is locked by a bolt 19, the nut 17 of each pair being tapped, whilst the corresponding nut 18 is smooth.

(B) The core 3 is supported by a support member or part 20, the sleeve 21 of which, integral therewith and carrying an external thread, passes through a circular opening in the body part 2 and is supported by the nut 22 and counter-nut 23.

In association with the part 20, an annular part 23, clamped between the part 20 and the body member 2, forms at 24 a seating for the bead extending round the bladder 4 and at 25 a constriction which makes it possible to lock the bead of the bladder in place, by clamping in the diaphragm on assembly.

The sleeve 21 has an internal conical thread 26 for the inflating valve, not shown, and it also comprises an internal channel 27 to allow the gas under pressure to reach the core 3. A tight seal is provided at 28.

(C) The core has openings 29 regularly distributed over the surface of the core, to enable the gas to pass from the core to the bladder, and vice-versa.

(D) The strainer 7 is hemi-spherical in form; the radius of the sphere is slightly larger than the radius of the sphere corresponding to the internal surface of the body part 1, and the said hemi-sphere is eccentric. On assembly it is put under tension by means of the two shoulders 30, 31 formed by the body part 2, and of the bearing point 32 provided by the connector 5. To this end the strainer has at 33 a non-perforated zone, which also offers the advantage of distributing the admission of liquid. Owing to the eccentricity of the strainer and to the bearing point 32, the position of which is calculated in relation to the said eccentricity, it is possible to distribute the admission of liquid over the whole effective surface of the strainer.

What we claim is:

1. In a device for damping pulsations, a substantially spherical hollow body portion provided with an internal spherical surface, a substantially spherical core housed within said hollow body and having an external spherical surface spaced from said internal spherical surface of said hollow body to define a chamber, an expansible diaphragm enclosing said core and supported within said chamber for expansion therein, said diaphragm in one position being contiguous to said external spherical surface of said core, said diaphragm in said one position being expanded and in its unexpanded position having a radius less than said core to place said diaphragm under a stress.

2. A device according to claim 1, wherein said core is hollow, a support member carried by and extending into said hollow body for supporting said core, said support member being provided with a channel adapted for passage of a gas intended to fill said diaphragm, said core being provided with openings communicating with said diaphragm to permit passage of said gas into said diaphragm.

3. A device according to claim 2, wherein said diaphragm is provided with an opening bordered by a bead, said support member for said core including clamping means for said bead.

4. A device according to claim 3, wherein said clamping means consists of an annular part disposed between the part supporting the core and the hollow body.

5. A device according to claim 1, wherein a strainer of substantially semi-spherical form is positioned within said hollow body so as to be interposed in the path of the admission of fluid to the hollow body, said strainer being eccentrically disposed with respect to the internal spherical surface of said hollow body.

References Cited in the file of this patent

UNITED STATES PATENTS

| | | |
|---|---|---|
| 2,351,761 | Hanna | June 20, 1944 |
| 2,394,401 | Overbeke | Feb. 5, 1946 |
| 2,550,892 | Weber et al. | May 1, 1951 |

FOREIGN PATENTS

| | | |
|---|---|---|
| 486,855 | Great Britain | Dec. 7, 1937 |